UNITED STATES PATENT OFFICE.

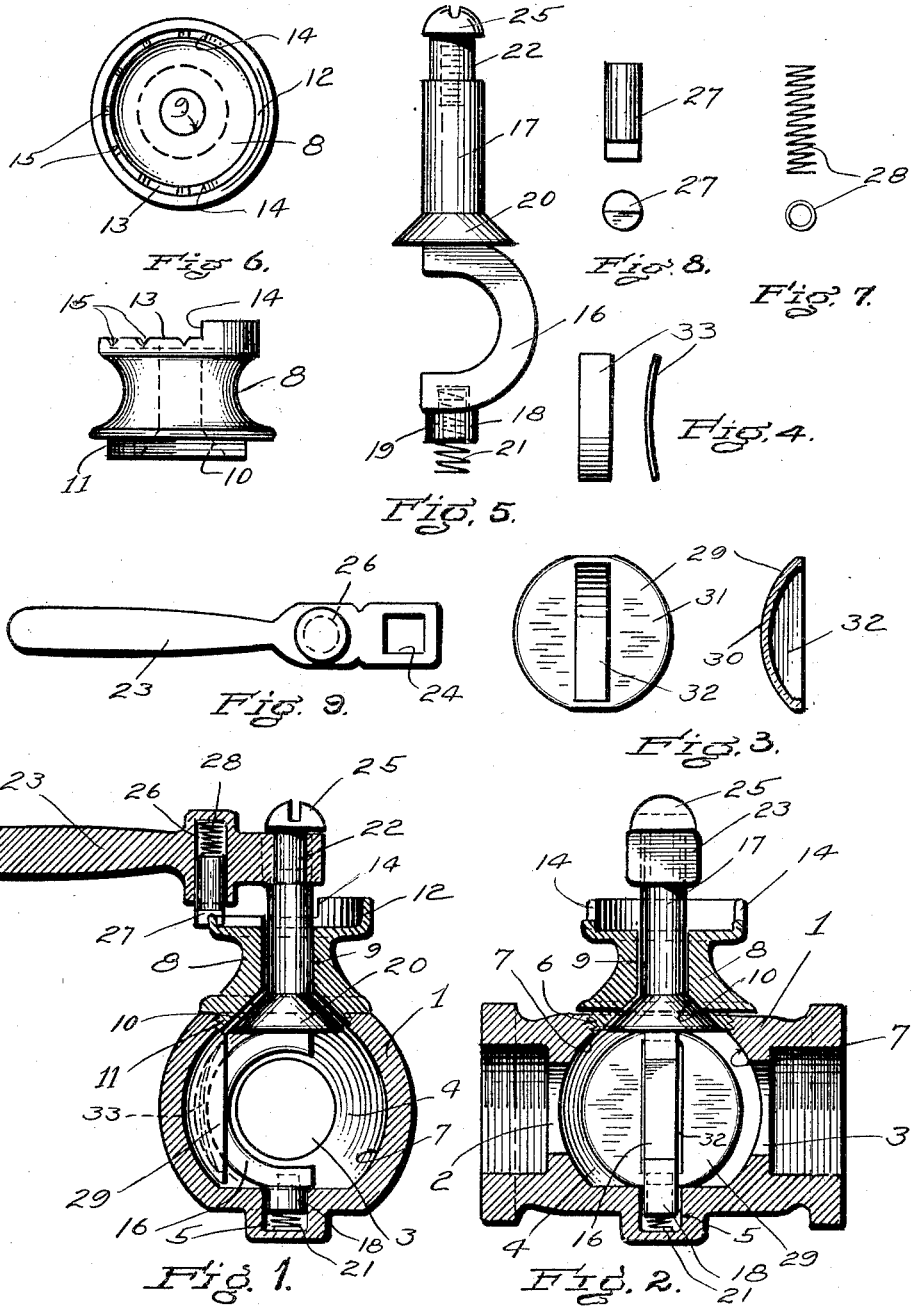

TILMAN WHITE, OF BERKELEY, CALIFORNIA, ASSIGNOR OF TWO-THIRDS TO GEORGE C. MORGAN, OF OAKLAND, CALIFORNIA.

VALVE.

1,076,802.　　　　　Specification of Letters Patent.　　Patented Oct. 28, 1913.

Application filed July 26, 1912. Serial No. 711,637.

*To all whom it may concern:*

Be it known that I, TILMAN WHITE, a citizen of the United States, residing at Berkeley, in the county of Alameda and State of California, have invented certain new and useful Improvements in Valves, of which the following is a specification.

My present invention relates to sliding valves, such as are opened or closed by movement of the valve member parallel to its seat.

The principal objects of my invention are to provide a valve which is quickly operated for the opening or closure of its outlet orifice; one which is fluid tight, avoiding the use of yieldable packing; and, a valve member for closure of the outlet orifice so disposed as to be freely forced against its seat by the pressure of the fluid controlled, and thus facilitating a tight closure of the outlet orifice.

Another object of my invention is to provide means for rigidly retaining the valve member in various positions relative to its seating, so that it will not be automatically moved by the current flow or by vibration.

In the drawings, forming a part of this specification:—Figure 1 is a view in central vertical transverse section through a valve embodying my invention. Fig. 2 is a view in central vertical longitudinal section through a valve embodying my invention. Fig. 3 is a combination view in elevation and central vertical section through a disk like valve member, forming a part of my invention. Fig. 4 is a similar view to Fig. 3 showing a spring used in connection with the valve. Fig. 5 is a view in elevation of actuating means for the valve member disposed in Fig. 3. Fig. 6 is a combination view in plan and side elevation of a bonnet of the valve embodying my invention. Fig. 7 is a combination view in elevation and plan of a spring used in connection with the valve. Fig. 8 is a view similar to Fig. 7 disclosing a detent used in retaining the valve member, disclosed in Fig. 3 in a fixed position relative to its seat. Fig. 9 is a plan view of the handle.

Similar characters refer to similar parts throughout the several views.

A valve casing, designated by 1, is formed with two orifices 2 and 3, preferably alined and opening into valve chamber 4. The bottom of chamber 4 has a set bearing or recess 5, circular in cross section, the axis of which is concentric to an internally threaded aperture 6 at the top of said chamber. The inclosing wall of the chamber 4, into which orifices 2 and 3 open, is formed spherically, as at 7, to provide a seating for the valve member to be hereinafter more specifically described.

A bonnet 8, provided with a central bore 9 and conical seat 10, at the lower end thereof, is secured to the top of casing 1, as by a threaded flange 11 of the bonnet engaging with the apertures 6 of the latter. This positions the axis of bore 9 coinciding with the axis of recess 5. The top of bonnet 8 may be provided with an upstanding annular flange 12, reduced in height as at 13, to provide abutments 14, the reduced portion 13 having V-shaped recesses 15 formed therein for a purpose to be subsequently described.

Within the chamber 4 is a yoke 16 substantially semi-annular in shape and diametrically opposite each other at the ends of the yoke is a stem 17 and trunnion 18, the latter being recessed as at 19. The stem 17 is accommodated by bore 9 of bonnet 8, and the trunnion 18, by recess 5. Surrounding the stem 17 above yoke 16 is a conical abutment 20 to fit in conical seat 10 of bonnet 8, and a spring 21 is interposed between the yoke 16 and bottom of recess 5, and accommodated by the said recess 19 in trunnion 18, to force said abutment 20 in close contact with seat 10, whereby a fluid tight joint is provided. The head of stem 17 is preferably polygonal in shape, as at 22, and the handle 23 has an aperture 24, formed complementary to the head 22, and is adapted to facilitate actuation of the stem. This handle may be held in place upon the stem 17 with the said aperture 24 receiving the head 22, as by a screw 25. The handle 23 may also be provided with a recess 26 open at its under side and directly above the said flange 12, when such is provided on the bonnet 8. A detent 27, having a beveled end, is reciprocable in said recess and normally forced in contact with the reduced portion 13 of said flange 14, by a spring 28. When the said detent abuts against either of the abutment portions, or either one of the recesses 15, the stem is prevented from moving, by vibration or action of the current flow through chamber 4.

It is to be noted that the handle 23 may be manually actuated and that the detent is capable of reciprocation against action of the spring 28 to become dislodged from the recess 15, at the will of the operator.

Within the chamber 4 is a disk-like valve member 29 adapted to control either orifice 2 or 3. The one face 30 of said member 29, for contact with seating 7, is formed complementary thereto, and the opposite face 31 has a concave groove 32 diametrically formed therein. This valve member 29 is positioned in chamber 4 with its face 30 contacting with seating 7 and its slot 32, receiving a portion of yoke 16. Between the outer curved face of the yoke 16 and the curved bottom of groove 32 is interposed a substantially flat spring 33 which forces the valve 29 against its seat, but permits free movement of the yoke 16 in a direction of its pivotal axis so as to provide close contact between abutment 20 and seat 10, responsive to action of spring 21, and to take up wear. It is to be noted, with particular reference to Fig. 1 of the drawing, that when the valve member 29 is actuated to permit free passage of fluid through chamber 4, the yoke 16 is so positioned as to not interfere with or retard movement of the fluid flowing from one orifice to the other, to any perceivable extent, because of its semi-annular shape.

It is understood that in operation, the valve stem is actuated to position the member 29 over the egress orifice of the valve, whichever it may be, so that the pressure of the fluid controlled comes upon the said member to force it tightly in contact with its seating, and this is made possible, inasmuch as the valve member 29 is not rigid with yoke 16, but capable of movement to take up wear, responsive to action of spring 33.

From the foregoing it is made manifest that I provide a sliding valve so arranged that the egress orifice may be quickly closed or opened, as by actuating handle 23; that a fluid tight engagement is made about contacting portions of the valve member 29 and its seating and also between abutment 20 and its seating; and, that the members 16 and 29 are free to move one relative to the other, to facilitate the contacting of parts to provide for a fluid tight engagement as described.

Changes in detail may be made without departing from the spirit and scope of my invention; but, I claim:—

A valve comprising in combination, a casing having a valve chamber with a wall of said chamber providing a spherical seat and two axially alined inlet and outlet orifices open to said chamber in the said wall, a disk like valve member having one face formed complementary to the said seat of said casing and its other face provided with an elongated groove, a valve stem extending into the said chamber of said casing with its axis of rotation substantially parallel to the said groove in said valve, a semi-annular yoke carried by said stem extending into the said groove of said valve member, and a spring interposed between the periphery of said yoke and the bottom of the said groove in said valve member, substantially as and for the purpose set forth.

In testimony whereof I affix my signature in presence of two witnesses.

TILMAN WHITE.

Witnesses:
M. M. ESCHERICH,
F. P. SCHROEDER.

---

Copies of this patent may be obtained for five cents each, by addressing the "Commissioner of Patents, Washington, D. C."